(12) United States Patent
Kram et al.

(10) Patent No.: US 7,227,139 B2
(45) Date of Patent: Jun. 5, 2007

(54) SYSTEM AND METHOD FOR OPTICAL DETECTION OF PETROLEUM AND OTHER PRODUCTS IN AN ENVIRONMENT

(75) Inventors: Mark Kram, Santa Barbara, CA (US); Leroy Laverman, Santa Barbara, CA (US)

(73) Assignee: The Regents of The University of California, Oakland, CA (US)

( * ) Notice: Subject to any disclaimer, the term of this patent is extended or adjusted under 35 U.S.C. 154(b) by 105 days.

(21) Appl. No.: 11/009,760

(22) Filed: Dec. 9, 2004

(65) Prior Publication Data

US 2005/0122225 A1 Jun. 9, 2005

Related U.S. Application Data

(63) Continuation-in-part of application No. 10/702,250, filed on Nov. 4, 2003, now abandoned.

(51) Int. Cl.
*G01N 21/64* (2006.01)
(52) U.S. Cl. ...................................... 250/301
(58) Field of Classification Search ................. 250/301
See application file for complete search history.

(56) References Cited

U.S. PATENT DOCUMENTS

| | | | |
|---|---|---|---|
| 3,745,566 A * | 7/1973 | Johnson .................... | 250/338.1 |
| 4,591,723 A * | 5/1986 | Akiyama .................. | 250/461.1 |
| 4,689,484 A | 8/1987 | McMahon | |
| 4,709,577 A | 12/1987 | Thompson | |
| 5,004,913 A | 4/1991 | Kleinerman | |
| 5,005,005 A | 4/1991 | Brossia et al. | |
| 5,200,615 A | 4/1993 | Hopenfeld | |
| 5,291,032 A | 3/1994 | Vali et al. | |
| 5,351,532 A | 10/1994 | Hager | |
| 5,424,959 A * | 6/1995 | Reyes et al. .................. | 702/28 |
| 5,537,336 A | 7/1996 | Joyce | |
| 5,569,842 A | 10/1996 | Silvestri | |
| 5,714,681 A | 2/1998 | Furness et al. | |
| 5,732,510 A | 3/1998 | Sutton et al. | |
| 5,818,737 A | 10/1998 | Orr et al. | |
| 5,974,860 A * | 11/1999 | Kuroda et al. ................. | 73/40 |
| 6,016,713 A | 1/2000 | Hale | |
| 6,184,980 B1 | 2/2001 | Brown et al. | |
| 6,429,812 B1 | 8/2002 | Hoffberg | |
| 6,445,983 B1 | 9/2002 | Dickson et al. | |
| 6,551,024 B1 | 4/2003 | Berg et al. | |
| 6,583,424 B2 * | 6/2003 | Staton et al. ............ | 250/461.2 |
| 2004/0178357 A1 * | 9/2004 | King ....................... | 250/458.1 |

FOREIGN PATENT DOCUMENTS

GB 2078941 A * 1/1982
WO WO 92/7249 A1 4/1992

* cited by examiner

*Primary Examiner*—Constantine Hannaher
(74) *Attorney, Agent, or Firm*—John P. O'Banion; Charles Berman (57) ABSTRACT

A system for detecting leaks of petroleum and other non-petroleum based products in an environment includes a sensor package comprising at least one LED and an optical photo-detector. The emitter transmits an excitation signal with an excitation wavelength, and the detector is tuned to the emission wavelengths of a fluorescing mixture, such as a petroleum based product, in a space where detection is sought. An alarm system coupled to the detector may be used for notifying users in case of a leak.

64 Claims, 6 Drawing Sheets

SYSTEM AND METHOD FOR OPTICAL DETECTION OF PETROLEUM AND OTHER PRODUCTS IN AN ENVIRONMENT

CROSS-REFERENCE TO RELATED APPLICATIONS

The contents of this application are a Continuation-In-Part of the U.S. application having Ser. No. 10/702,250 filed on Nov. 4, 2003 now abandoned and is incorporated by reference herein.

BACKGROUND

1. Field of the Invention

The present invention relates generally to the use of optical sensors to detect the presence of petroleum and non-petroleum based liquids, fluids, or products in a sample, medium, or environment.

2. General Background and State of the Art

Systems and methods for detecting leaks of petroleum or other products, in an environment or medium, are well known in the prior art. Most of these techniques use a quantitative approach to identify a leak or to determine leak rate based on a measurement of volumetric changes of the product. The capability of prior art leak detection methods to accurately measure leakage is affected by certain variables such as temperature change, surrounding medium characteristics, product evaporation, and the characteristics of the product. Furthermore, temperature variation, which is a substantial factor, causes dynamic expansion or contraction of the stored product on both a short-term and long-term basis. Indeed, changes in ambient temperature throughout the day are often large enough so as to "mask" the leakage rate to be measured. For example, a change of 0.01° F. per hour in a 10,000 gallon tank will cause a 0.068 gallon change in the product volume per hour, thus offsetting or amplifying an observed leak rate.

Most of the prior art methods for leak detection attempt to compensate for such temperature variations. Some prior art methods of leak detection attempt to measure condensation in the space. There is still a need for a reliable and economical method and apparatus for detecting the presence of a petroleum or non-petroleum fluid in a medium or environment.

SUMMARY

The present system and method for detecting petroleum or non-petroleum fluids, in a medium or environment, is based on an extensive emission spectral library for petroleum-based compounds. Recent developments in light emitting diode (LED) and organic light emitting diode (OLED) technologies have led to the potential for inexpensive design alternatives. Currently available optical detection systems can only distinguish the difference between aqueous and non-aqueous media through the use of conductivity sensors. Furthermore, these detection schemes are subject to environmental deterioration, thereby increasing the cost and complexity of the sensor. Furthermore, conductivity sensors for leak detection lead to potential false positive alarms. The system according to the present invention is based on the selection of the appropriate excitation wavelength(s) and detection setup, which are optimized to match the fluorescence properties of petroleum materials (or other non-petroleum products) using a spectral library. The present system is also able to minimize false alarms, as it can withstand effects from water condensation.

An object of the present system is to provide an alarm trigger when petroleum based liquids (i.e., petroleum oils, lubricants, and oily wastes), or other fluids, have been released in the surrounding medium such as the interstitial space of a double-walled storage tank or from a transportation vessel (e.g., vehicle or ship). This device consists of a unique optical based sensor platform that detects a fluorescence signal from leaked products. The sensor can be coupled to an appropriate alarm system which notifies users of a release before it becomes an environmental hazard. Rough characterization of leaked products (such as petroleum or non-petroleum liquids) can be accomplished by using an array of sensors tuned to appropriate excitation and emission wavelengths. Excitation sources may be inexpensive light emitting diodes (LEDs) or organic light emitting diodes (OLEDs). The detection system consists of an appropriately filtered silicon photo-detector. The sensitivity can be dramatically increased by using a lock-in or differential signal amplifier to reduce background noise.

Accordingly, in one embodiment, a system of detecting the presence of a product, such as a petroleum based liquid, comprises: (i) an excitation source for transmitting an excitation signal with an excitation wavelength, (ii) a detector tuned to the emission wavelengths of the petroleum based liquid in a space where detection is sought; and (iii) an alarm system coupled to the detector. The system may further include means for notifying when the detector detects a presence of the petroleum based liquid, a first band-pass filter for preventing a low energy scattered light signal to be delivered to the detector, and a second band-pass filter for filtering the excitation signal. The excitation source includes at least one of a light emitting diode or an organic light emitting diode. The detector may be an optical sensor such as a silicon photo-detector. Additionally, the excitation and emission wavelengths may be determined from the fluorescence properties of the petroleum based liquid, wherein the fluorescence properties of the petroleum based liquid is determined from a spectral library.

Accordingly, a method of detecting the presence of a petroleum based liquid comprises: (i) determining the appropriate excitation and emission wavelengths of said petroleum based liquid; (ii) locating a optical sensor tuned to the determined excitation and emission wavelengths in a space where detection is sought; (iii) coupling the sensor to an alarm system; and (iv) notifying a user when the optical sensor detects a possible release.

Accordingly, in yet another embodiment, a system for detecting the presence of a petroleum based liquid, including polynuclear aromatic hydrocarbons, in a space or environment comprises: (i) at least one emitter with an excitation wavelength in a non-visible region of the electromagnetic spectrum, (ii) at least one detector tuned to an emission wavelength of the petroleum based liquid in the space or environment where detection is sought. The emitter, in one aspect, is an LED that operates in the near ultraviolet region of the electromagnetic spectrum (viz., approximately in the range of 240 to 380 nanometers) and induces fluorescence in the petroleum based liquid. Optionally, the excitation wavelength is selected from a spectral library comprising wavelengths that induce fluorescence in the petroleum based liquid. The detector includes at least one of a silicon photodiode or a cadmium sulfide photo-resistor, a miniature charge coupled device (CCD), or a diode array tuned to a signal from the petroleum based liquid. Furthermore, the petroleum based liquid need not include an additive fluorescent dye.

Additionally, at least one quality assuring LED may be used for determining the reliability of the detector, and at least one quality assuring diode, possibly without any encapsulation, could be used for determining the reliability of the emitter. The system may further include a high pass filter for filtering the signal from the emitter, and a low pass filter, such as a colored-glass filter or an interference dichroic type filter, for minimizing the energy of reflective components wherein the reflective components includes the combination of the excitation signal arriving directly from the emitter and the signal arriving after reflection of surfaces in the space.

Furthermore, a switching circuit for switching the emitter on or off with a predetermined duty cycle may be used for improving the detection limits of the petroleum based liquid by canceling at least one interfering signal. In one aspect, the switching rate corresponds to the smallest frequency which is an even integer multiple of at least one interfering signal frequency.

In addition to petroleum detection applications, the present system and method can be adapted for various optical applications involving cooling water leak detection, medical applications, single and multi-wavelength probes for environmental characterization of the distribution of contaminants in soil, total maximum daily loads (TMDLs) of industrial discharges, biosensors, DNA analyses, water quality assessment, air quality assessment, vegetation stress characterization and classification, soil analyses, organic constituent analyses, ocean water quality applications for organic and inorganic concentrations, anthropogenic oil spill detection and monitoring, and oil research activities. Furthermore, several of these applications are amenable to wireless data transmission and therefore remote sensing configurations.

DETAILED DESCRIPTION

Reference will now be made in detail to an exemplary embodiment of the present invention, an example which is illustrated in the accompanying drawing (FIGS. 1–12).

Figure 1:
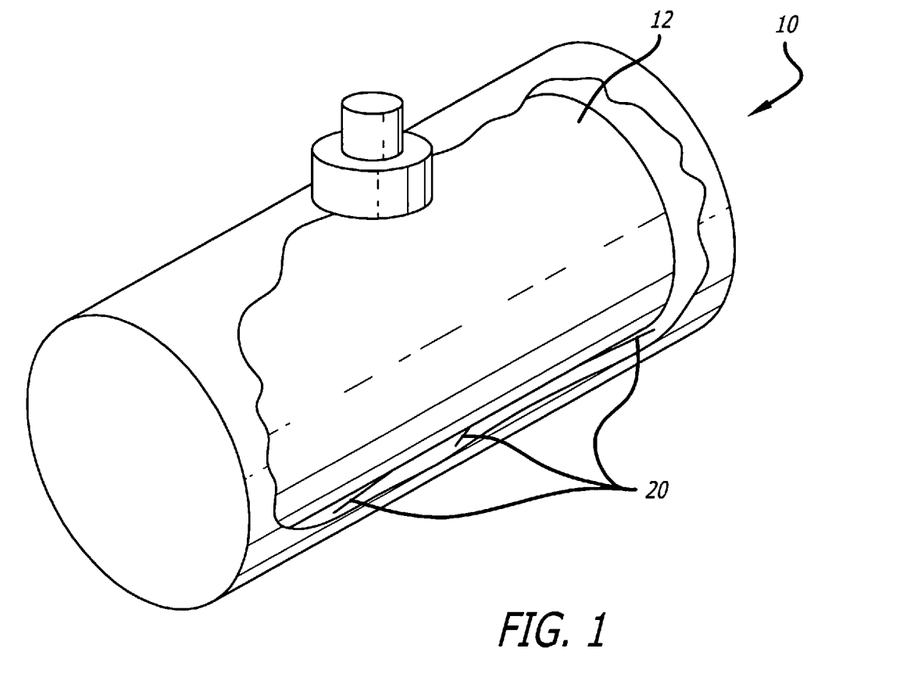
FIG. 1 is an exemplary depiction of the positioning of the petroleum detection sensor package in a tank.

Optimal detection parameters are determined for several selected petroleum materials commonly found in underground and aboveground tanks (gasoline, fuel oils etc.) generally depicted as 12. Appropriate excitation and emission wavelengths are then selected for detecting specific petroleum based materials. The emission wavelengths generally vary depending on the petroleum product (in some cases these wavelengths are between 400 and 600 nm). In one aspect of the present invention, the excitation wavelengths may be in the ultra-violet region (e.g., 300–400 nm region) but may vary depending on the product to be detected. This information is used to determine off-the-shelf and customized devices for detecting petroleum liquid releases from the tank 12. The system of the present invention utilizes relatively inexpensive sensor package 20 configured to serve as a continuous real-time monitoring alarm system. This system will serve as a first alert warning prior to petroleum contaminant releases to the subsurface, protecting ground water resources on a global scale.

The system 20 is based on an extensive excitation-emission spectral library for petroleum-based compounds. Recent developments in light emitting diode (LED) and organic light emitting diode (OLED) technologies have led to the potential for inexpensive design alternatives. Currently available optical leak detection systems can only distinguish the difference between aqueous and non-aqueous media through the use of conductivity sensors. This increases the cost and complexity of the sensor and can lead to potential false positive alarms. The system according to the present invention is based on the selection of the appropriate excitation and detection elements (e.g., the choice of LED excitation source and choice of bandpass filters as described below) which can be optimized to match the fluorescence properties of petroleum materials using a spectral library. The system also minimizes false alarms and is more robust than conductivity applications which are subject to failure due to water condensation.

The spectral library refers to an extensive set of records of three dimensional excitation-emission spectra of many petroleum products. The three dimensional data allows one to choose the optical excitation and emission wavelengths for greatest sensitivity. In one aspect, this record may be in the form of a searchable library. While it is possible to use this library for optimizing the system (e.g., obtaining the greatest sensitivity), it may not always be necessary to do so, as the concentrations of fluorophores in the petroleum products can be so high that many excitation wavelengths may meet the sensitivity requirements for adequate detection. Thus, an option would be to "match", or select an appropriate wavelength (either optimal or adequate for the intended use), by referring to the spectral library or by running a new analysis on the product of interest. This can be accomplished by generating a guidance equation based on either the excitation wavelength optimization or the detection adequacy relative to (i) the detector used, and (ii) combined excitation and emission spectra. For instance, as long as the detection threshold is met using a specific wavelength, the system should work, and this will generally depend on the excitation device setup, the detector used, and the data processing approach.

Figure 2:
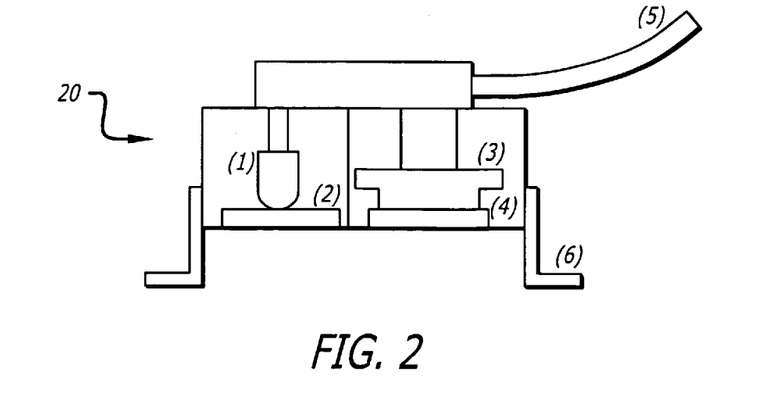
FIG. 2 is a schematic of the sensor package including an optical sensor.

The system 20 includes an optical sensor package, including an appropriate emitter such as an LED or OLED 1, for detecting the petroleum product of interest at the lowest detection concentration through the use of a spectral library. The LED 1 can be linked to selected locations between the inner and outer wall of the double walled container 12 (e.g., low spots, areas of potential liquid accumulation following a release from the inner wall, etc.) by low voltage electrical cables 5. The detector is linked to an alarm or visible notification system (e.g., bright red light). Monitoring can be continuous or as frequently as deemed acceptable via a push button system, dial, or other mechanical or software device. If a breach is detected, the user can sample the space between the tank's two walls using existing technology for confirmation prior to tank excavation or leak repair.

The sensor head or package 20 is mounted via brackets 6, in one aspect of the invention, at the bottom of the interstitial space in a double wall storage tank 12. Leaking petroleum liquids will collect at the bottom of the tank and trigger an alarm from the detected fluorescence signal. The device depicted in FIG. 2 consists of two subassemblies, (1) excitation source 1 and an (2) optical detector 3 such as a photon detector. Excitation light will come from an ultra-violet or blue LED or OLED 1 chosen to match the fluorescing product(s) of interest. An appropriate band-pass filter 4 prevents lower energy scattered light from interfering with detection. A different band-pass filter (which may be coupled with the band-pass filter 4) removes the excitation light and allows only the fluorescence signal to be detected when fluorophores are present. In the absence of fluorophores no signal will be observed. Improved sensitivity can be achieved by modulating the excitation source and detecting the signal with a lock-in amplifier. This greatly improves the signal to noise ratio (SNR) and increases the sensitivity of the measurement. The signal may be delivered by the cable 5 for additional post-processing.

Figure 3:
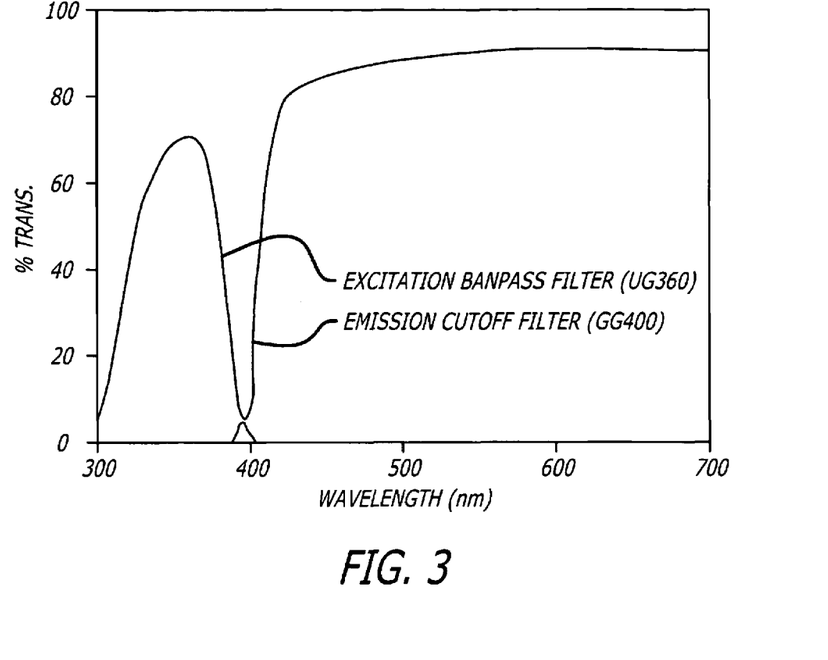
FIG. 3 is a plot of the transmission spectra of the excitation bandpass and emission cutoff filters according to one aspect of the present invention.

In one aspect of the invention, the choice of bandpass filters is determined by the choice of LED and detection region. In this scenario, the general idea is to prevent any light from the LED from striking the detector and giving a high background signal. Since LEDs are not generally monochromatic light sources, it is desirable to remove the long wavelength components with a bandpass or cutoff filter. This bandpass filter could be removed, provided the LED source has a sufficiently narrow wavelength range (i.e., a wavelength that does not overlap with the detection range). On the detection side, an additional filter is required to filter out the light from the excitation source. FIG. 3 shows the transmission curves for the two filters that could be used in the sensor. In the optimal situation, there will be virtually no overlap in the two curves, thereby resulting in a very low signal in the absence of a leaked product.

There are several advantages of the present invention over prior art systems. The present invention provides for continuous real-time detection of petroleum tank release. The present invention similarly provides for continuous real-time notification of tank release. The system of the present invention is relatively inexpensive and can be readily adaptable to currently available double-walled tanks, and can be integrated with currently available leak detection and alarm software packages. The system is easily upgradeable after deployment to improve sensitivity. Furthermore, a major benefit of the present invention is that an optical system is not triggered by aqueous condensation, reducing the potential for false alarms.

Furthermore, excitation light source modulation and connection to a lock-in amplifier could be incorporated to increase system sensitivity and SNR, and hence may be included with the sensor package 20.

Figure 4:
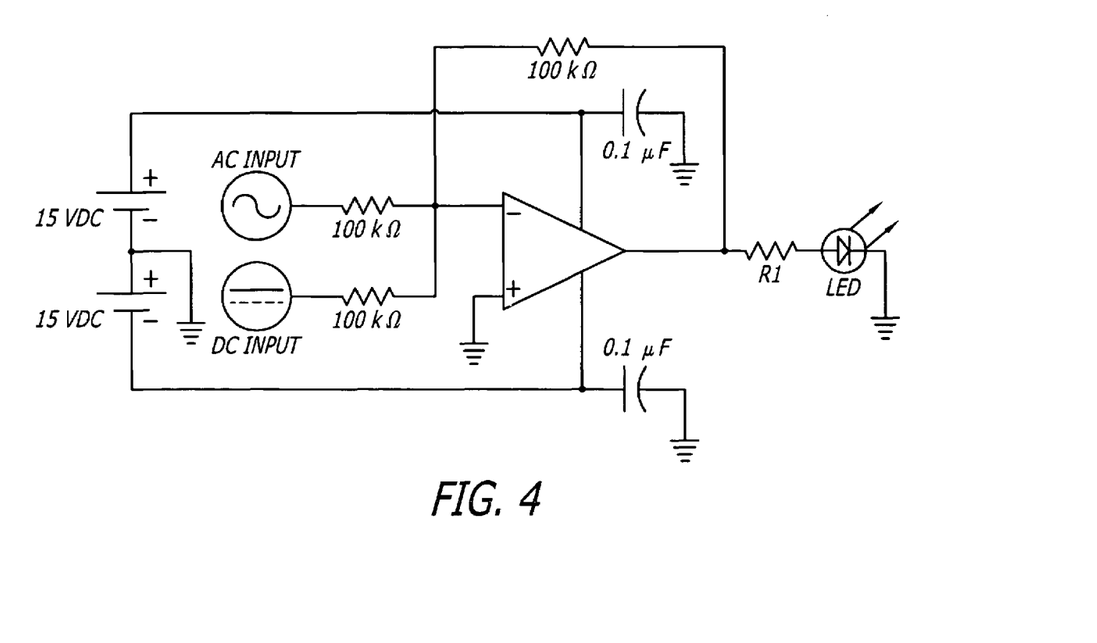
FIG. 4 is a circuit diagram including an operational amplifier for a 1:1 addition of two electrical signals.

In one aspect of the present invention, the system may use AC and DC analog outputs from a lock-in amplifier (e.g., the Stanford Research Model SR510 lock-in amplifier). The two signals are added using a simple op-amp circuit (FIG. 4). The AC signal can be altered through a GPIB computer interface using software that could be written in LabView. In a real application of the sensor, according to the present invention, a much simpler circuit could be constructed to apply a square wave potential to the LED to apply an appropriate modulation frequency.

The advantages of modulating the excitation source and using lock-in amplification are a dramatic improvement in the signal to noise ratio. In one aspect of the present invention, the modulation frequencies may be of an order of about 200–400 Hz. Furthermore, lock-in amplification can result in several orders of magnitude in increased sensitivity. However, the system according to the present invention does not need to be overly sensitive, but needs to be only sensitive enough to detect the presence of a fuel product over some detection threshold. For many petroleum products, fluorophore concentrations in the mixtures are high enough to allow for detection at very low concentrations (e.g., detection is more of a presence/absence type of measurement).

Figure 5:
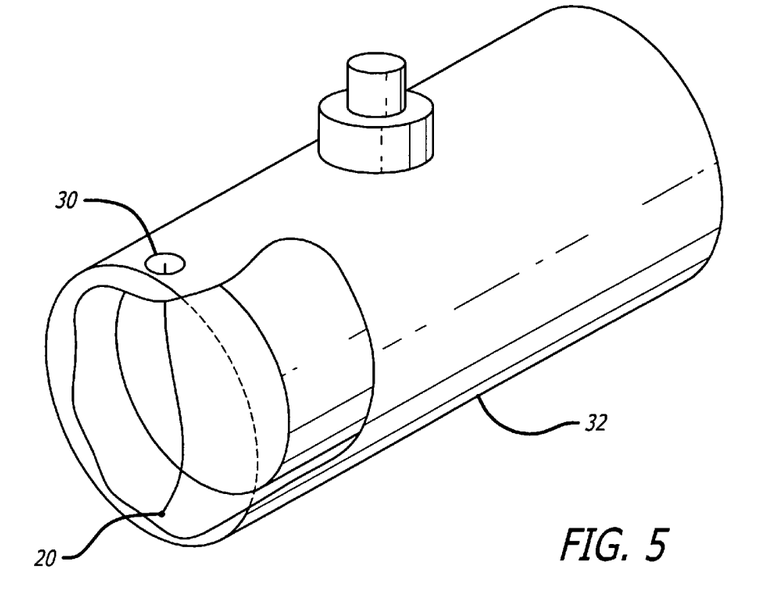
FIG. 5 is an alternative embodiment for sensor placement in the interstitial space of a double wall storage tank positioned for facile installation and retrieval of a sensor head assembly.

FIG. 5 is an alternative embodiment for sensor placement in the interstitial space of a double wall storage tank. The sensor access port 30 allows for retrieval and replacement of the sensor if required. The sensor is placed in a location where released product can accumulate in the outer tank 32 (e.g., a low elevation position or an engineered depression). One advantage with this embodiment is that if a leak has been detected, the system can be retrieved while repairs and decontamination efforts are implemented. The sensor can then be re-set into place for future detection service.

In another aspect of the present invention, the sensor system could be constructed by simply monitoring the voltage from the photodiode using a continuously operating diode. If the fluorescence signals are sufficiently intense, then this can result in a system that is simple and relatively inexpensive to deploy.

In an alternative embodiment, the following detectors may be used: (i) Photomultiplier tubes (PMTs), (ii) Avalanche photodiodes (APDs), (iii) Diode array detectors, (iv) Charge coupled devices (CCDs), or (v) CMOS sensors.

Furthermore, other excitation sources, that provide much greater power than LEDs or OLEDs, could be included in the sensor package. These include: (i) Arc lamps (Xe, Hg), (ii) Deuterium lamps, (iii) Gas lasers (e.g., nitrogen lasers, excimer lasers (XeF, XeCl)), (iv) Solid state lasers (e.g., frequency tripled Nd:YAG).

Additionally, alternate delivery mediums such as optical fibers, fiber bundles or liquid filled light guides may be placed in the interstitial space of the storage tank. For example, one set of fibers for delivering the excitation source and an additional set of fibers for recovering the emitted fluorescence signal may be used. With appropriate optics, single fibers may be used for both excitation and emission signals. This has the advantage of removing all electrical components from inside the tank and placing them remotely.

Figure 6:
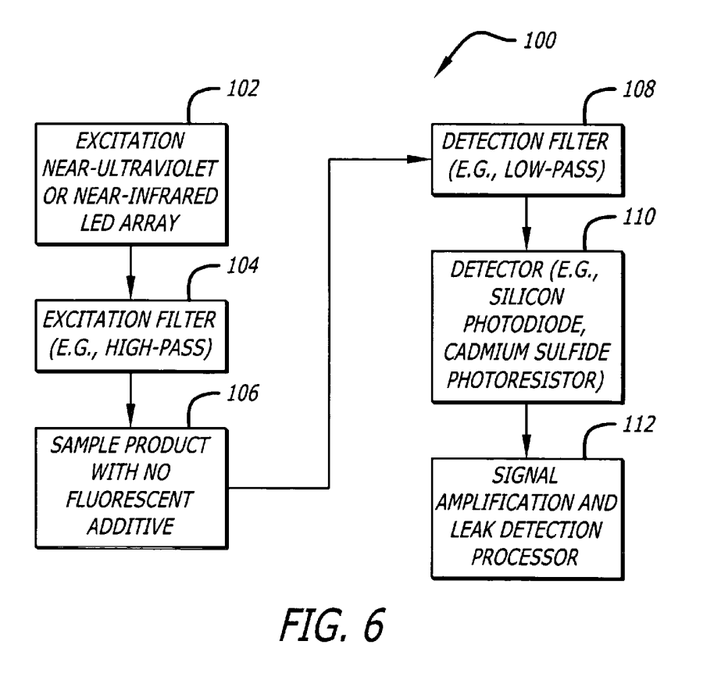
FIG. 6 is a block diagram depicting another embodiment for detecting a petroleum based product in a space.

In an alternative embodiment, FIG. 6 shows an overview block diagram 100 for detecting a product (such as petroleum or any other product/material that can fluoresce) in a space of interest or medium/environment. Specifically, an excitation source 102, such as at least one LED or optionally an array of LED emitters, transmits a "probe" signal having an excitation wavelength approximately in the range of 240 to 380 nanometers in the near ultraviolet region of the electromagnetic spectrum. This excitation light then passes through a high pass excitation filter (HPF) 104 and illuminates the space having the petroleum sample 106. Light returning from the sample 106, via reflection and/or fluorescence, passes through the low pass detection filter (LPF) 108, which removes the reflection component. The remaining light falls upon a light detector 110, which may be a silicon photodiode or a cadmium sulfide photoresistor, or other type of emission detector. The photodiode signal is amplified, digitized, and processed by a circuit 112 to yield an indication of the amount of fluorescence present. Thus if the target sample is known a priori and a calibration has been performed, the amount of fluorescent material present may be quantitatively determined. The calibration step comprises of generating a functional relationship between emission intensity and concentration. When an emission signal is detected, the concentration of the material can be determined based on this calibration relationship. Thus, calibration is achieved by measuring the signals from samples containing known amounts of fluorescent materials under similar conditions in which the sensor package 20 is deployed. The resulting data describe a linear relationship between the observed signal and the concentration of fluorescent material that may by used to quantify the amount of fluorescent material in an unknown sample.

The advantage of using an emitter operating in the near ultraviolet region of the electromagnetic spectrum is that there is no requirement for a fluorescent dye, or any other additives, to be present in the fluorescing product for detecting a leak in the space. In fact, such emitters may effectively induce fluorescence in diesel, gasoline, and other petroleum constituents that include polynuclear aromatic hydrocarbons (PAHs) amenable to this excitation wavelength. Furthermore, the choice of emitter LEDs will generally determine the excitation wavelength. With the LEDs presently in use, the excitation light must be passed through an HPF excitation filter since a small fraction of the LEDs' light output falls sufficiently far from the peak to register on the detector. Thus, the function of the HPF is to block a fraction of the LED emission in extraneous bands overlapping with the fluorescence return to allow better detection rates. For example, for certain choices of LEDs, an HPF is required to remove visible frequencies from the LED outputs, since many such diodes have a substantial amount of light emitted in the visible region of the electromagnetic spectrum. Generally, HPFs, for the present application, do not need a sharp cutoff, so an inexpensive colored-glass filter could be used.

Figure 7:
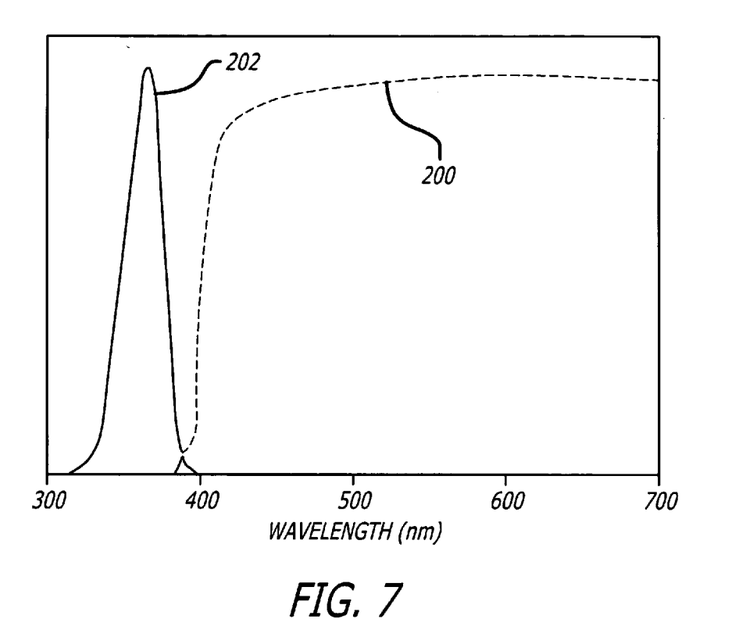
FIG. 7 is a plot of the transmission spectra of the excitation and emission filters according to another aspect of the present invention.
Figure 11:
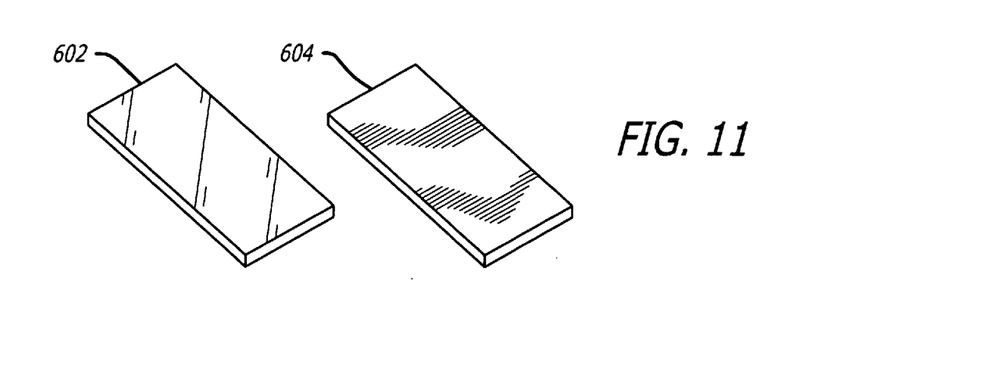
FIG. 11 depicts the high-pass and low-pass filters used at the transmitter and receiver end respectively.

The function of the LPF is to substantially remove the reflection component of the signal arriving at the detector photodiode as well as the primary emitter emission from reaching the detector photodiode. To satisfy this criteria, the detection filter may be a colored-glass filter or an interference (dichroic) type filter. Manufactures of such HPFs and LPFs include Edmund Optics of New Jersey (USA). As an example, FIG. 7 shows a plot of the transmission spectra of the HPF 202 and LPF 200 according to one aspect of the present invention, whereas FIG. 11 shows an exemplary HPF 604 (comprising of Hoya U-360 material) and LPF 602 (comprising Schott GG 455 material).

Figure 8:
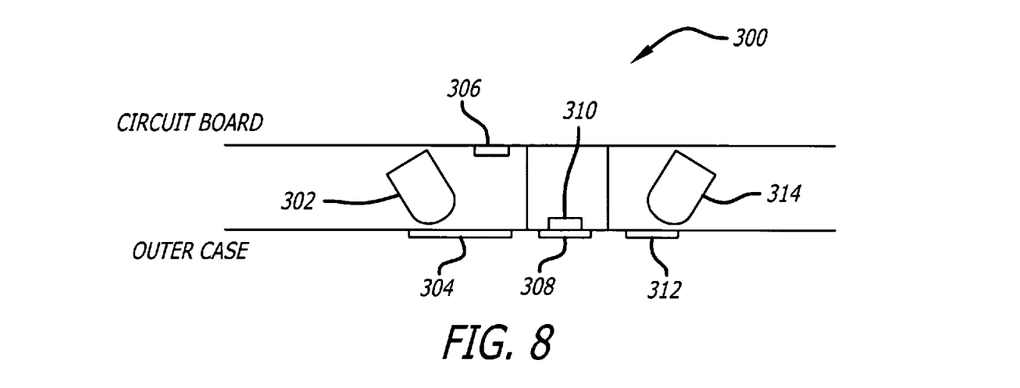
FIG. 8 is an overview diagram of an exemplary aspect showing the relation of the different elements in the sensor package for detecting the presence of a petroleum based liquid.

FIG. 8 is an overview diagram of an exemplary aspect showing the relation of the different elements in the sensor package for detecting the presence of a fluorescing liquid (such as a petroleum based product). As evident, the sensor package may also include quality assurance (QA) elements 306 and 314 (in addition to the emitter LEDs 302, photodetector 310, HPF 304, LPF 308, and a transparent or semi-transparent window 312) for periodically determining the reliability of the emitter LEDs and the primary photodetector used for detecting petroleum or other products.

In one aspect, a QA photodiode 306 is placed adjacent to the emitter LEDs 302 and in proximity with the excitation HPF 304. Some of the light scatter from the LEDs 302, as well as reflections off the HPF 304, are collected by the QA photodiode 306. Subsequently, the signal from the QA photodiode 306 provides an indicator as to whether, (a) the excitation or emitter LEDs are working nominally, and (b) the signal from the QA diode is proportional to the light output from the excitation LEDs. The QA photodiode 306 may thus be used to identify small changes occurring from LED aging or changes in temperature, as well as rapid/large changes (or the absence of a signal) that represent a malfunction in the system. For example, if the intensity of the emitter LEDs drop by about 5%, the QA diode will measure this drop and can adjust, or normalize, the calibration of the detection stage accordingly. Most of the signal processing steps are common between the QA photodiode 306 and the detector photodiode 310, so changes in the signal path will affect both and can be easily compensated for. The QA photodiode 306 is not plastic-encapsulated, and hence does not suffer from plastic yellowing, which is a typical problem in systems operating in the UV wavelengths of the electromagnetic spectrum.

In a further aspect, the system may include a QA LED 314 operating at a wavelength which can pass through the LPF 308 and be measured by the photodiode 310. While the QA LED 314 would not induce fluorescence, the incident energy of this LED, however, would be detected directly by the photodiode, thereby indicating whether the photodiode is in fact operating correctly or not. Furthermore, the QA LED may also be used to determine whether the sampling space has been fouled by compounds or dust that can deposit onto the surface of optical elements. In other words, significant changes (most likely a decrease) in the QA signal indicate some obstruction or fouling of the sampling space or filter windows. Thus, as shown in FIG. 8, emitter LEDs 302 have the detector photodiode 310 has a QA LED 314 mounted adjacent to it, and wherein the signal delivered to the QA LED 314 is a switchable current source. As with the excitation QA system, the entire signal path used in normal operation is exercised since the QA signal passes through the LPF 308 striking the sampling space and is scattered/reflected back through the HPF 304 and is detected by the photodiode 310. Aging of the QA LED 314 is not likely to be a problem, since the LED is active only occasionally, thereby preventing the QA LED from being subjected to significant operating-time-related age effects.

In one aspect, the QA LED may have a peak wavelength of about 635 nanometers, or lower, with the QA response being substantially time-invariant and stable in the midband of the detector photodiode response. Furthermore, the emitter LEDs 302 may be switched on and off with a predetermined duty cycle. This switching causes a corresponding fluctuation in the intensity of the observed fluorescence such that light impinging on the photodetector from other sources, and other random noise sources (e.g. photodetector dark current), will not be amplified, thus resulting in a minimal signal contribution from other signal sources. Thus, this LED modulation (viz., on/off switching) allows substantial rejection of electrical and optical signal sources that may cause interferences during detection. Accordingly, in one aspect, the frequency of the signal for causing LED switching is approximately 600 Hz, which is the smallest frequency that is an even integer multiple of interfering signals having frequencies of 50 and 60 Hz. Furthermore, an added benefit of emitter LED modulation is that it causes an AC modulation of the fluorescence signal which enables further improvement in the detection limits of petroleum leakages.

At the detector end, incoming light from the target sample passes through the detection filter 308 and strikes the detection photodiode 310. The detection filter 308 may be a colored-glass filter or an interference (dichroic) type filter. The response of the photodiode typically sets the outer limits on the detected wavelengths, with reasonable efficiency from near-UV through near-IR. This is a range which encompasses many target fluorophores in petroleum products, particularly among aromatic organic chemicals of moderate size. In one aspect, the detector is a silicon photodiode, operated photoconductively under reverse bias for improved speed (versus photovoltaic mode). The output current from the photodiode is proportional to the number of photons striking the photodiode, and the bias voltage is constant. In an alternative aspect of the present system, the photodetector diode may be chosen such that the spectral response is most sensitive to emission of non-petroleum products.

The petroleum leak detection system may be built as two sections, the "head" and the "base", separated by a cable up to thirty feet long. Alternatively, these may be assembled together on the same circuit board, tested, then sawed apart. The head circuit board provides mounting for the optics, and also contains most of the amplification circuitry. The signals transmitted over the cable are thus less susceptible to interference and crosstalk. The base circuit board includes the remaining processing, control, interface, and power supply functions. The signal from the head is received at the base, where it is routed to a 12 bit analog-to-digital converter (ADC). Similarly, a 10 bit DAC produces the requisite voltage signals to operate the system. The digital signals are routed to and from the base microcontroller in serial format.

Figure 9:
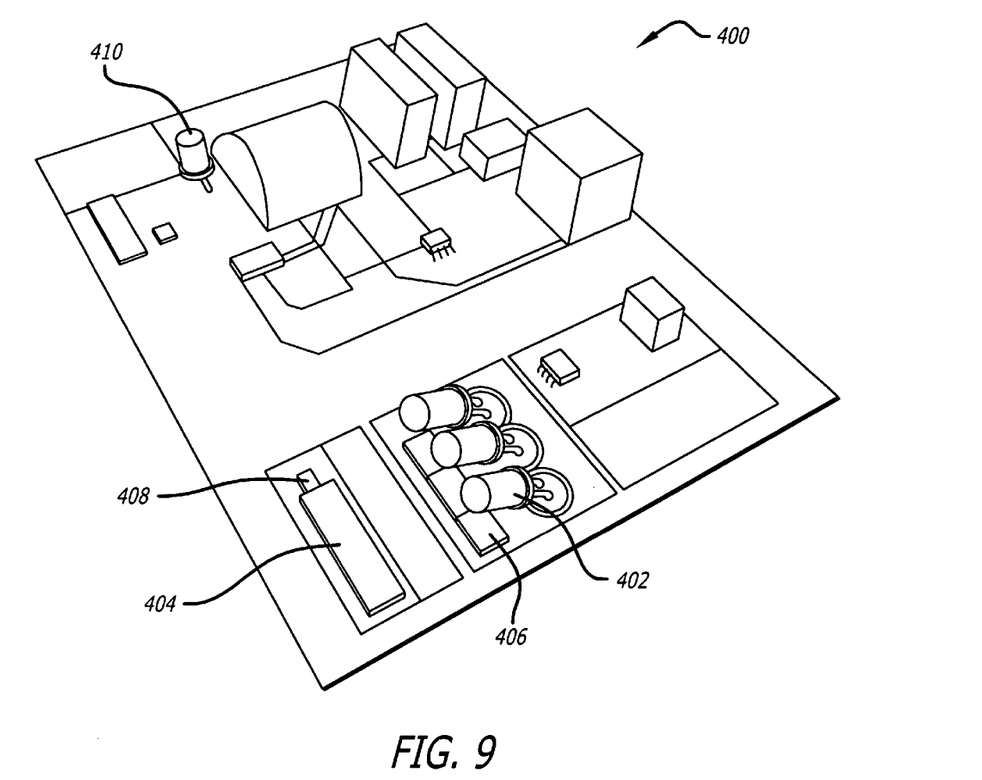
FIG. 9 is an exemplary depiction of a circuit board employing the various emitters, detector photodiode, quality assuring devices, and signal processing circuitry for detecting the presence of a petroleum based liquid in an interstitial space.

FIG. 9 an exemplary depiction of a circuit board 400 employing the various LED emitters 402, detector photodiode 404, quality assuring elements such as the QA LED 408 and QA diode 406. Additional LEDs (e.g., 410) may be included for performing system checks and/or for indicating the presence of a product sample.

Figure 12:
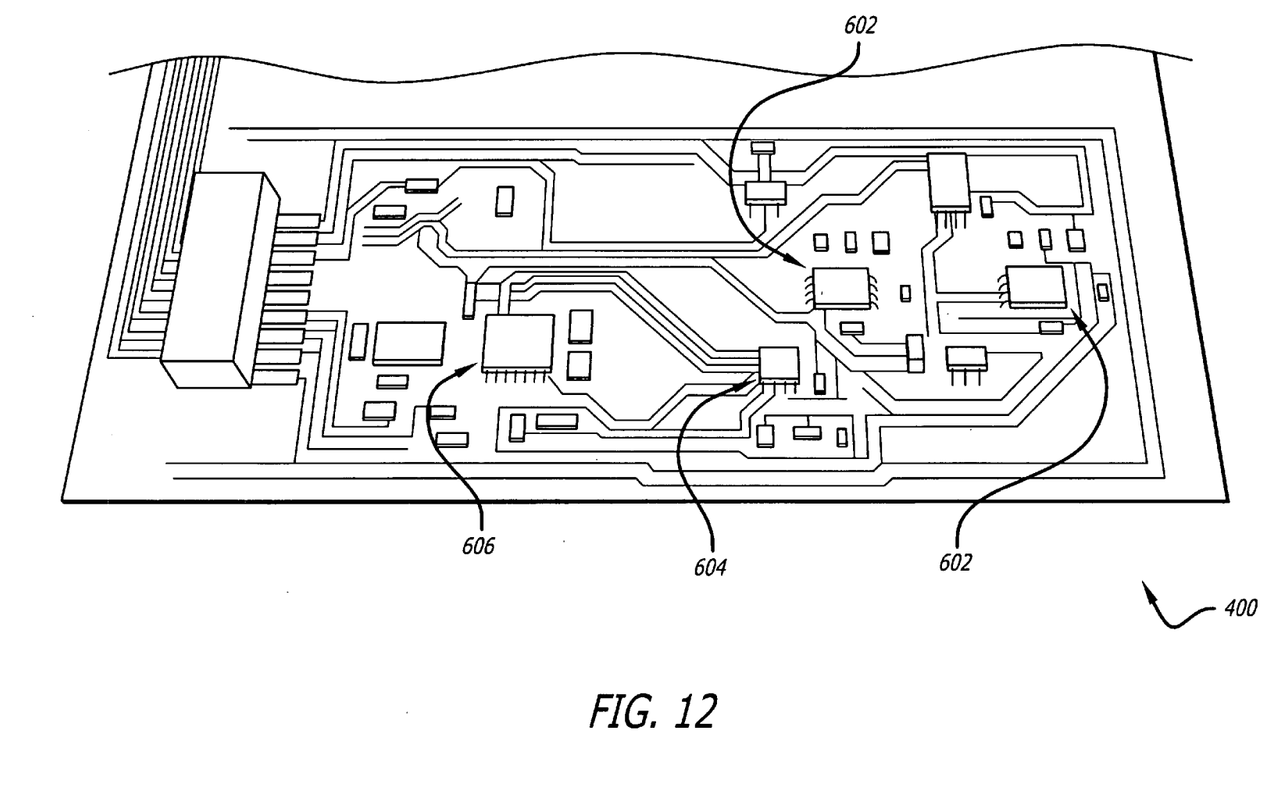
FIG. 12 is an exemplary depiction of a circuit board showing the various signal processing circuitry including various amplifier stages.

As shown in FIG. 12, pre-amplification of the signal from the detectors is provided by two trans-impedance amplifiers (TIAs) 602 in the signal processing circuitry on board 400 for converting the current signal into a voltage signal. The signal from the selected TIA is subsequently delivered to two cascaded variable gain amplifiers (VGAs) or programmable gain amplifiers (PGAs) 604 and 606. The total amplification is from 1× to 1024×, software selected (autoranging). As shown, the emitter LEDs are arranged in a linear array. Alternatively, they may be arranged in a circular or a rectangular array for maximizing the emitted signal to noise/interference ratio.

The signal path is substantially bandpass. Low frequencies representing steady background light and DC errors, as well as high frequencies representing primarily noise and interference, are removed. The signal is referred to a "virtual ground" which differs from actual ground and is set by the operating software through a digital to analog converter (DAC). The amplifiers cannot produce negative outputs with respect to actual ground, making the use of the virtual ground necessarry. The optimal virtual ground level decreases as the excitation duty fraction decreases; nonnoptimal VG level will reduce the effectiveness of the autoranging. The second VGA's output and the virtual ground are both transmitted over the cable to the base. The effect of outside inteference, which usually affects both of them similarly, is reduced by transmitting both to the analog to digital converter (ADC) which takes the difference between the two.

A multiplexor, integrated with the second VGA, can be used to bypass the DC blocks in order to test for saturation of any of the VGAs or the TIAs. Saturation is most likely to occur in the TIA due to excessive background light striking the detector, but it can also result from various internal failures and disturbances. Other multiplexor inputs allow monitoring of the bias voltage for the TIAs and checking the temperature of the head as reported by a thermistor.

The system may be designed to run on DC power of 12 to 18 volts (nominal) from which several internal supplies could be additionally derived. In the present example, only linear regulators were used, as the power levels were substantially small to justify the complexity of switching regulators. Two large (TO-220 packaged) regulators in the "base" produce +8 and +6 volt supplies. The +8 volt supply operates the LED array, whereas the +6 volt supply is used to power two small (TSSOP packaged) +5V regulators, one each in the base and head, which power the remaining circuitry. The reason for using a +6 rail was to have a local regulator in the head (to reduce the level of noise at the most critical circuitry) while adding as little power dissipation as possible (since the head may be encapsulated in plastic for field use). The +5V supply in the base may be of the same type as the one in the head for simplicity.

The detector system in an exemplary aspect is operated under the control of two microcontrollers. A microcontroller combines a digital computer processor, memory, program storage, and useful peripherals in a single integrated circuit. This promotes flexibility as many of the system parameters may be changed easily through reprogramming. Further, alternate operating modes and internal test-and-calibration procedures may readily be invoked. Accordingly, one microcontroller, located in the base, performs the majority of the command-control-communications functions. The second microcontroller, located in the head, has the much simpler job of producing local control signals reflecting instructions received from the first microcontroller. The single data line linking the two microcontrollers replaces at least three (and more likely five) wires otherwise required in the connecting cable.

Since the emitter LEDs are current-mode devices, the light output is directly controlled by an operating current. Accordingly, the emitter LEDs are driven by a programmable current sink, and some of the steps in delivering signals to the emitter LEDs, in an exemplary aspect, include:
(a) determining the appropriate command operating current,
(b) determining an appropriate voltage by means of a DAC,
(c) outputting the DAC voltage to an operational amplifier,
(d) controlling a MOSFET through an operational amplifier, causing the voltage to be reproduced across a resistor (wherein the current through the resistor is now equal to the command current), (e) receiving the desired current by the emitter LEDs, wherein the LEDs are connected in series with the MOSFET.

Additional circuitry on the circuit board 400 may be included to, (i) allow the microcontroller to turn the emitter LEDs on and off quickly without having to reset the DAC each time, (ii) limit the rate of change of the current, to reduce the interference that the circuit generates, (iii) limit the current change (for e.g., instead of turning the emitter LEDs current completely off, the current may be a minimum of 2.5% of the maximum output, which reduces electromagnetic field interference by about 75% while reducing available signal by only 2.5%).

Figure 10:
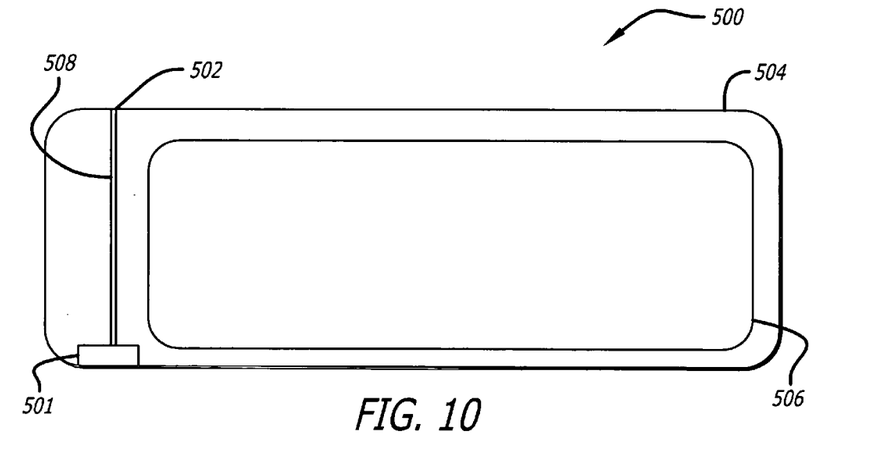
FIG. 10 is an exemplary depiction of the placement of the sensor package in an interstitial space for detecting the presence of a petroleum based liquid.

FIG. 10 is an exemplary depiction of the placement of the sensor package in an interstitial space for detecting the presence of a petroleum based liquid. As shown in the figure, the sensor package 501 (which could be the "head" end) is placed in an interstitial space between the outer and inner walls, 504 and 506, respectively. As mentioned earlier, the head circuit board provides mounting for the optics as well as most of the amplification circuitry. The signals, as they are transmitted over the cable 508 to the sensor access port 502 having the "base" end, are less susceptible to interference and crosstalk. The base circuit board includes the remaining processing, control, interface, and power supply functions. In an alternative embodiment, the signals from the sensor package 501 may be transmitted wirelessly to the remaining circuitry near the sensor access port 502.

It is to be understood that other embodiments may be utilized and structural and functional changes may be made without departing from the respective scope of the present invention. Possible modifications to the system include, but are not limited to, generation of a stand-alone software package, linking the system to an automatic measurement device set for a specific time step, linking the system to an alarm which could be audible, or contacting the responsible parties via telephone or electronic mail. Multiple sensors can be used to monitor large-scale tank farms with control via appropriate software. In addition, the sensors can be strategically placed in the interstitial walls of an oil tanker and marine fuel tanks. Additionally, the emitter LEDs may be of differing wavelengths and more than one photodetector diode may be used for detecting the presence of a petroleum or other products. Furthermore, the present system and method may be easily adapted for detection in medical applications, cooling water leak detection, single and multi-wavelength probes for environmental characterization of the distribution of contaminants in soil, total maximum daily loads (TMDLs) of industrial discharges, biosensors, DNA analysis, water/air/soil/organic/vegetation quality analysis, ocean water quality applications for organic and inorganic concentrations, anthropogenic oil spill detection and monitoring, and oil research activities, open channel flow monitors, plugged chute detectors, and dry run monitors. In essence, the sensor system according to the various embodiments could potentially be applied to any system employing fluorescence detection using an inexpensive fluorimeter that is set up with hardware to match the excitation and emission spectra of target fluorophores.

We claim:

1. A system for detecting the presence of a petroleum based liquid, the system comprising:
    at least one emitter with an excitation wavelength in a non-visible region of the electromagnetic spectrum;
    at least one detector tuned to an emission wavelength of said petroleum based liquid in an environment where detection is sought;
    at least one quality assuring LED for determining the presence of fouling or obstruction within an optical path of the at least one emitter and the at least one detector; and
    at least one quality assuring diode for determining the reliability of the at least one emitter.

2. The system of claim 1 wherein the emitter includes a light emitting diode (LED).

3. The system of claim 2 wherein the LED operates in a near ultraviolet region of the electromagnetic spectrum.

4. The system of claim 1 wherein the detector includes at least one of a silicon photodiode or an cadmium sulfide photo-resistor tuned to a signal from the petroleum based liquid.

5. The system of claim 1 wherein the petroleum based liquid does not include an additive fluorescent dye.

6. The system of claim 1 wherein the at least one emitter induces fluorescence in the petroleum based liquid.

7. The system of claim 1 further including a high pass filter for filtering the signal from the emitter to prevent visible frequencies from being transmitted.

8. The system of claim 1 further including a low pass filter for minimizing the energy of a reflection component, said low pass filter being at least one of a colored glass filter or an interference dichroic type filter.

9. The system of claim 8 wherein the reflection component includes at least an excitation signal arriving directly from the at least one emitter and a signal arriving after reflection of surfaces in a sampling space located within the optical path.

10. The system of claim 1 wherein the at least one quality assuring diode does not include plastic encapsulation.

11. The system of claim 1 wherein the at least one quality assuring LED operates in a visible range of the electromagnetic spectrum.

12. The system of claim 1 further including a switching circuit for switching the emitter on or off with a predetermined switching rate for canceling at least one interfering signal.

13. The system of claim 12 wherein the switching rate corresponds to the smallest frequency which is an even integer multiple of at least one interfering signal frequency.

14. The system of claim 13 wherein the switching rate is greater than or equal to 600 Hz.

15. The system of claim 12 wherein the at least one interfering signal has a frequency approximately 50 Hz.

16. The system of claim 12 wherein the at least one interfering signal has a frequency approximately 60 Hz.

17. A system for detecting the presence of a substance, the system comprising:
    at least one emitter with an excitation wavelength in a non-visible region of the electromagnetic spectrum;
    at least one detector tuned to an emission wavelength of said substance in an environment where detection is sought;
    at least one quality assuring LED for determining the presence of fouling or obstruction within an optical path of the at least one emitter and the at least one detector; and
    at least one quality assuring diode for determining the reliability of the at least one emitter.

18. The system of claim 17 wherein the emitter includes a light emitting diode (LED).

19. The system of claim 18 wherein the LED operates in a near ultraviolet region of the electromagnetic spectrum.

20. The system of claim 17 wherein the detector includes at least one of a silicon photodiode or an cadmium sulfide photo-resistor tuned to a signal from the substance.

21. The system of claim 17 wherein the substance does not include an additive fluorescent dye.

22. The system of claim 17 wherein the at least one emitter induces fluorescence in the substance.

23. The system of claim 17 further including a high pass filter for filtering the signal from the emitter to prevent visible frequencies from being transmitted.

24. The system of claim 17 further including a low pass filter for minimizing the energy of a reflection component, said low pass filter being at least one of a colored glass filter or an interference dichroic type filter.

25. The system of claim 24 wherein the reflection component includes at least an excitation signal arriving directly from the at least one emitter and a signal arriving after reflection of surfaces in a sampling space located within the optical path.

26. The system of claim 17 wherein the at least one quality assuring diode does not include plastic encapsulation.

27. The system of claim 17 wherein the at least one quality assuring LED operates in a visible range of the electromagnetic spectrum.

28. The system of claim 17 further including a switching circuit for switching the emitter on or off with a predetermined switching rate for canceling at least one interfering signal.

29. The system of claim 28 wherein the switching rate corresponds to the smallest frequency which is an even integer multiple of at least one interfering signal frequency.

30. The system of claim 29 wherein the switching rate is greater than or equal to 600 Hz.

31. The system of claim 28 wherein the at least one interfering signal has a frequency approximately 50 Hz.

32. The system of claim 28 wherein the at least one interfering signal has a frequency approximately 60 Hz.

33. A system for detecting the presence of a petroleum based liquid, the system comprising:
at least one emitter with an excitation wavelength in a non-visible region of the electromagnetic spectrum;
at least one detector tuned to an emission wavelength of said petroleum based liquid in an environment where detection is sought;
at least one quality assuring LED for determining the presence of fouling or obstruction within an optical path of the at least one emitter and the at least one detector.

34. The system of claim 33 wherein the emitter includes a light emitting diode (LED).

35. The system of claim 33 wherein the LED operates in a near ultraviolet region of the electromagnetic spectrum.

36. The system of claim 33 wherein the detector includes at least one of a silicon photodiode or an cadmium sulfide photo-resistor tuned to a signal from the petroleum based liquid.

37. The system of claim 33 wherein the petroleum based liquid does not include an additive fluorescent dye.

38. The system of claim 33 wherein the at least one emitter induces fluorescence in the petroleum based liquid.

39. The system of claim 33 further including a high pass filter for filtering the signal from the emitter to prevent visible frequencies from being transmitted.

40. The system of claim 33 further including a low pass filter for minimizing the energy of a reflection component, said low pass filter being at least one of a colored glass filter or an interference dichroic type filter.

41. The system of claim 40 wherein the reflection component includes at least an excitation signal arriving directly from the at least one emitter and a signal arriving after reflection of surfaces in a sampling space located within the optical path.

42. The system of claim 33 wherein the at least one quality assuring LED does not include plastic encapsulation.

43. The system of claim 33 wherein the at least one quality assuring LED operates in a visible range of the electromagnetic spectrum.

44. The system of claim 33 further including a switching circuit for switching the emitter on or off with a predetermined switching rate for canceling at least one interfering signal.

45. The system of claim 44 wherein the switching rate corresponds to the smallest frequency which is an even integer multiple of at least one interfering signal frequency.

46. The system of claim 45 wherein the switching rate is greater than or equal to 600 Hz.

47. The system of claim 44 wherein the at least one interfering signal has a frequency approximately 50 Hz.

48. The system of claim 44 wherein the at least one interfering signal has a frequency approximately 60 Hz.

49. A system for detecting the presence of a substance, the system comprising:
at least one emitter with an excitation wavelength in a non-visible region of the electromagnetic spectrum;
at least one detector tuned to an emission wavelength of said substance in an environment where detection is sought; and
at least one quality assuring LED for determining the presence of fouling or obstruction within an optical path of the at least one emitter and the at least one detector.

50. The system of claim 49 wherein the emitter includes a light emitting diode(LED).

51. The system of claim 50 wherein the LED operates in a near ultraviolet region of the electromagnetic spectrum.

52. The system of claim 49 wherein the detector includes at least one of a silicon photodiode or an cadmium sulfide photo-resistor tuned to a signal from the substance.

53. The system of claim 49 wherein the substance does not include an additive fluorescent dye.

54. The system of claim 49 wherein the at least one emitter induces fluorescence in the substance.

55. The system of claim 49 further including a high pass filter for filtering the signal from the emitter to prevent visible frequencies from being transmitted.

56. The system of claim 49 further including a low pass filter for minimizing the energy of a reflection component, said low pass filter being at least one of a colored glass filter or an interference dichroic type filter.

57. The system of claim 56 wherein the reflection component includes at least an excitation signal arriving directly from the at least one emitter and a signal arriving after reflection of surfaces in a sampling space located within the optical path.

58. The system of claim 49 wherein the at least one quality assuring LED does not include plastic encapsulation.

59. The system of claim 49 wherein the at least one quality assuring LED operates in a visible range of the electromagnetic spectrum.

60. The system of claim 49 further including a switching circuit for switching the emitter on or off with a predetermined switching rate for canceling at least one interfering signal.

61. The system of claim 60 wherein the switching rate corresponds to the smallest frequency which is an even integer multiple of at least one interfering signal frequency.

62. The system of claim 61 wherein the switching rate is greater than or equal to 600 Hz.

63. The system of claim 60 wherein the at least one interfering signal has a frequency approximately 50 Hz.

64. The system of claim 60 wherein the at least one interfering signal has a frequency approximately 60 Hz.

* * * * *